United States Patent [19]
Furuuchi et al.

[11] 3,864,659
[45] Feb. 4, 1975

[54] HUMIDITY SENSOR

[75] Inventors: Shigemasa Furuuchi; Hironiri Ohta; Koichi Sugaya; Tadatoshi Kamimori, all of Yokohama, Japan

[73] Assignee: Asahi Glass Company, Ltd., Tokyo, Japan

[22] Filed: July 25, 1973

[21] Appl. No.: 382,517

[30] Foreign Application Priority Data
July 25, 1972  Japan.............................. 47-73809
Mar. 27, 1973  Japan.............................. 48-34096

[52] U.S. Cl...................... 338/35, 23/254 E, 73/73, 200/61.06, 340/235
[51] Int. Cl............................................ H01c 13/00
[58] Field of Search .................. 338/34, 35; 73/73; 200/61.06; 23/254 E; 340/235

[56] References Cited
UNITED STATES PATENTS
2,543,384  2/1951  Squier.................................. 338/35
3,077,774  2/1963  McIlvaine......................... 338/35 X
3,295,088  12/1966  Smith................................. 338/35

*Primary Examiner*—C. L. Albritton
*Attorney, Agent, or Firm*—Oblon, Fisher, Spivak, McClelland & Maier

[57]        ABSTRACT

Humidity sensors are formed by spatially arranging a pair of electrodes in approximately close parallel juxtaposition onto a glass surface, so that a sensing gap is formed between said electrodes, wherein said electrodes and said sensing gap are covered by a membrane of a cured amino group containing organosilicon compound.

4 Claims, 5 Drawing Figures

HUMIDITY SENSOR

BACKGROUND OF THE INVENTION

1. Field of the Invention

This invention relates to a humidity sensor for detecting moisture which has condensed on insulating plates, such as glass.

2. Description of the Prior Art

Effective humidity sensors are required which can serve the dual functions of automatically detecting moisture which has condensed on insulating surfaces such as glass plates or the like, and which are capable of activating a switch for operating resistive elements such as defrosters, or window glass wipers.

Sensors are known for this purpose which generally provide a series of parallel situated electrodes which are connected in series, and having a structure resembling the teeth of a comb, wherein the smaller electrodes of opposite polarity are placed in interlocking relationship with each other. Those sensors will respond to humidity by detecting the change in resistance of the gaps between individual electrodes of opposite polarity when moisture condenses on the plate. However, these conventional electrodes, have not possessed sufficient durability, stability and sensitivity. For example, the terminals of the humidity sensors usually are damaged with use as the resistance of the sensor terminals increase over long periods of operation. This tendency is accentuated when the surface of the terminals of the humidity sensor become stained or deteriorate through increased wear.

A need, therefore, exists for humidity sensors whose electrodes are more resistant to wear and which exhibit much more consistant resistance characteristics.

SUMMARY OF THE INVENTION

Accordingly, one object of this invention is to provide a humidity sensor which does not have any of the above described disadvantages and is useful in practical applications.

Briefly, this object and other objects of this invention as hereinafter will become more readily apparent can be attained by providing an improved humidity sensor having a pair of electrodes fixedly formed in approximately parallel juxtaposition onto an insulating plate which electrically detects moisture that has condensed on the surface of the insulating plate wherein the improvement comprises the formation of a cured amino group containing aminosilicon compound (hereinafter referred to as an aminosilicon compound) and preferably together with a reactive compound over the electrodes and the gap between the electrodes. The electrodes covered with the membrane of this invention provide a sensitive system for the detection of condensed moisture on the humidity sensor.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Many different types of substrates can be used which qualify as suitable insulating plates and include materials such as glass, plastics, ceramics, insulation-coated metals and the like. The electrodes of the humidity sensor of this invention can be terminals which function by electrically detecting the change in electrical resistance of the surface of the plates which is caused by moisture which has condensed on the membrane of the humidity sensor. The moisture which has condensed on the insulating plate supporting the electrode assembly of the humidity sensor causes a change in the electrical resistivity between the pair of electrodes, wherein each electrode consists of at least one smaller electrode, which enables the sensor to detect the humidity level. The terminals of the humidity sensor preferably are composed of an electrode material which does not decompose nor is inactivated by migration of the electrode components to the anode side of the sensor. Furthermore, the electron carriers of the electrode material must not be consumed, nor can the electrical resistance through electrical shorts increase over long periods of unuse which occur as a result of moisture condensing on the electrodes.

The electrodes of the invention are preferably prepared by printing a paste-like conductive composition composed of a mixture of a glass frit in a vehicle with a metal or metal oxide which migrates very slowly such as gold, platinum, palladium or ruthenium oxide, and then baking the composition on the insulating plate.

Figure 1:
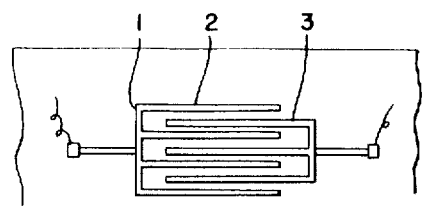
FIG. 1 is a front view of the humidity sensor of one embodiment of this invention.

As shown in FIG. 1, the terminals of the humidity sensor of this invention are preferably formed in the shape of a comb wherein a plurality of small branches (2), and (3) represent the teeth of the comb. Each branch of the terminal has a width of 0.5 – 2 mm with a gap of 0.5 – 5 mm between branches of opposite polarity on the insulation plate (1). Before the electrodes of the humidity sensor are coated on the insulating plate, an undercoating layer of a hydrophilic resin, water glass or a metal oxide containing $TiO_2$, $Cr_2O_3$, $SnO_2$, or the like may be applied to stabilize the surface. In order to improve the adhesive force of the membrane, membranes having a thickness of 1 – 30$\mu$ may be used which cover at least a portion of the pair of electrodes on the insulation plate. Suitable membrane materials contain metal oxides such as $SiO_2$, $TiO_2$, $Cr_2O_3$, $Fe_2O_3$, NiO, ZnO, $Al_2O_3$, Ni-Cu ferrite, and Mn-Zn ferrite.

After the humidity sensor is formed on the insulating plate, a coating of an organosilicon compound containing an amino group can be applied over the humidity sensor. The organosilicon compounds containing amino groups (aminosilicon compound) which may be used include curable compounds. Aminoorganofunctional alkoxysilanes are especially effective and include N-(trimethoxysilylpropyl)ethylenediamine[$NH_2(CH_2)_2NH(CH_2)_3Si-(OCH_3)_3$], N-(di-methoxymethylsilylpropyl)ethylenediamine [$NH_2(CH_2)_2-NH(CH_2)_3Si(CH_3)(OCH_3)_2$], N-triethoxysilylpropylamine [$NH_2(CH_2)_3-Si(OC_2H_5)_3$], N-dimethoxymethylsilylisobutylethylenediamine [$(CH_3O)_2CH_3SiCH_2C(CH_3)_2-NH(CH_2)_2NH_2$], bis-($\beta$-hydroxyethyl) $\gamma$-aminopropyl triethoxysilane [$(C_2H_5O)_3Si(CH_2)_3N[(CH_2)_2OH]_2$], $CH_3NH(CH_2)_3Si(OCH_3)_3$, [$(CH_3)_3SiO]_3Si(CH_2)_3NHCH_2CH_2NH_2$, $H_2NCH_2CH_2NH(CH_2)_3(CH_3)_2SiOSi(CH_3)_3$, $(CH_3O)_3Si(CH_2)_3NH_2$, $(CH_3O)_3Si(CH_2)_3N(CH_3)_2$, $(C_2H_5O)_2CH_3Si(CH_2)_4NH_2$, $(CH_3O)_3SiCH_2NHCH_2CH_2NH_2$, $(CH_3O)_3SiC_6H_4CH_2NHCH_2CH_2NH_2$, $(CH_3O)_3Si(CH_2)_3NHCH_3$, $(CH_3O)_3Si(CH_2)_3N(CH_3)_2$. The aminosilicon compounds, while obviously including the compounds listed, are not limited to just these compounds. These organosilicon compounds can be coated on the humidity sensor over the insulating plates by conventional coating methods such as spray-coating, impregnation-coating, or brush-coating of the compound or a solution of the compound in an organic solvent such as an alcohol. After coating, the composition can be cured by ageing or by heating.

In another embodiment of this invention, the membrane of the aminosilicon compound is reinforced by using a combination of the aminosilicon compound and a reactive compound to cover the gap between the electrodes. The function of the reactive compound is that it reacts, polymerizes, or condenses with the aminosilicon compound. The type of reactive compounds used can be those which form a strong membrane by reaction with the aminosilicon compound and which polymerize themselves. The type of reactive functional group incorporated within the reactive compound depends upon how the compound is used. If the reactive compound is to be polymerized, a reactive double bond is incorporated for the polymerization. If the reactive compound is to bond with the insulating base plate, functional groups are incorporated which bond thereto. The reactive compound also includes those which react with the alkoxy or amino group of the aminosilicon compound. Suitable compounds include compounds containing reactive groups such as epoxy, alkoxide, acryloyl, methacryloyl, and the like. Specific examples of these compounds include acrylic esters, methacrylic esters, methacryl silanes, epoxy silanes and the like.

The aminosilicon compound and the reactive compound can be coated onto the insulating plates by the following methods.

1. Both the aminosilicon compound and the reactive compound can be mixed with or without the addition of a solvent, and the mixture is coated on the pair of electrodes of the humidity sensor;
2. The reactive compound is first converted to a prepolymer. Then the aminosilicon compound is mixed with the prepolymer and the mixture is coated on the pair of electrodes of the humidity sensor;
3. Either one of the compounds is coated on the pair of electrodes and a gel is formed. Subsequently, the other compound is applied to the surface of the gel and allowed to diffuse through the gel; or
4. The aminosilicon compound and the reactive compound can be separately coated on the pair of electrodes. If necessary, a polymerization catalyst can be added to the aminosilicon compound or the reactive compound. The coating of the mixed materials is applied over the parallel spaced pair of electrodes which cover a predetermined area. After applying the materials, the resulting membrane is rapidly hardened by heating the membrane at 80° – 150° C for 30 minutes to 20 hours. In the application of the aminosilicon compound and the reactive compound the ratio of the aminosilicon compound to the reactive compound preferably is 1 : 1 – 50 parts by weight from the viewpoint of resistance to fogging, the prevention of humidity reliance, the hardness of the coated membrane, durability, and the like.

In the construction of the membrane over the electrodes two limitations must be considered. Application of the coating of the amino group containing organosilicon compounds provides a degree of water repellency which can prevent the condensation of even small amounts of moisture in the gap between the electrodes which thereby decreases the initial change in resistance of the electrodes when the moisture condenses. On the other hand, when appropriate amounts of moisture condense on the electrode system, the resistance values exhibited by the humidity sensor can be reduced to optimum values which enhance the use of the humidity sensor as a switch. Moreover, both the condensation of moisture and the resistance change upon frosting can be stabilized while the resistance change caused by stains can be minimized and the durability can be improved. By utilizing these facts optimum electrode characteristics can be achieved by balancing the water repellency effect of the silicon compound and the hydrophilic properties of the amino group of the aminosilicon compound.

The combination of the aminosilicon compound with the reactive compound, in comparison to membranes made of aminosilicon compounds alone, result in membranes having improved wear resistance, abrasion resistance, an improved ability to detect moisture which had condensed on the sensor as a result of a decreased humidity reliance and improved moisture condensation on the membrane. These advantages may be optimized by the presence of an appropriate quantity of the water repelling alkyl and silyl groups in the aminosilicon compound balanced by an appropriate quantity of the hydrophilic amino group. Also, the density of the membrane is another factor to be considered. These factors also effect the humidity reliance of the sensor which results in a sensor with substantially improved characteristics.

Having generally described this invention, a further understanding can be obtained by reference to certain specific examples which are provided herein for purpose of illustration only and are not intended to be limiting unless otherwise specified.

EXAMPLE 1

A paste-like composition containing ruthenium oxide, glass frit and a vehicle was printed on a glass plate so that a pair of electrodes each having a series of smaller electrodes such that the electrode pattern resembled the teeth of a comb were so disposed that the smaller electrodes were 1 mm wide, 155 mm long and had a gap of 2 mm between electrodes of opposite polarity as shown in FIG. 1. The printed electrodes were then sintered.

A 10 percent solution of n-(trimethoxysilylpropyl)ethylenediamine in ethanol was coated on the gap between the electrodes and then heated at 120° C for 15 minutes. After cooling, a 12 V alternating current was impressed across the electrodes of FIG. 1 in order to conduct the durability tests in which the plate was alternately fogged and defrosted at the rate of 10 cycles per hour.

Figure 3:
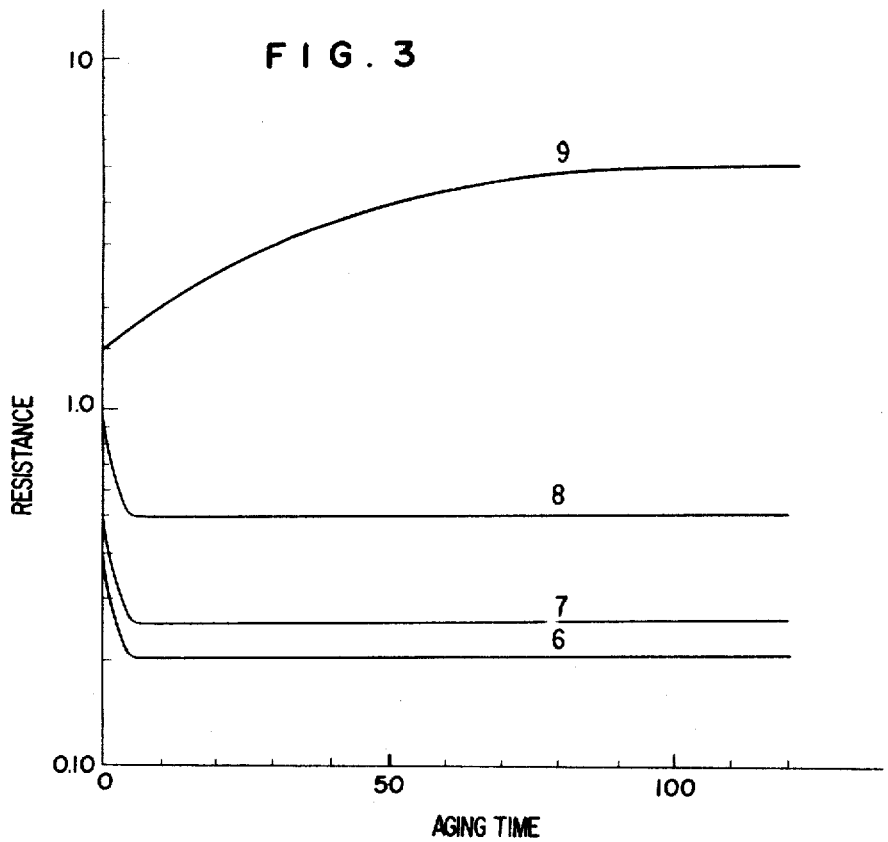

The resistance changes in the durability test are shown in FIG. 3 as curve 6.

EXAMPLE 2

The pair of electrodes of Example 1 was formed on a glass plate and an aqueous sodium silicate solution was coated over the gap between the electrodes and dried by heating at 150° C for 30 minutes. A 10 percent solution of n-(trimethoxysilylpropyl)ethylenediamine in ethanol was then coated on the plate and the plate was cured by heating at 120° C for 15 minutes. The results of the durability tests of the electrodes of Example 2 are shown in FIG. 3 as curve 7.

EXAMPLE 3

The paste-like electroconductive composition of Example 1 was printed on a glass plate in the form of a pair of electrodes having a line width of 1 mm each and a gap between the electrodes of 1 mm. The printed electrodes were then sintered. A chromium oxide membrane was formed by a plasma melt method over the gap between the electrodes, and a 10 percent solution of n-(trimethoxysilylpropyl)ethylenediamine in ethanol was coated over the oxide membrane and was cured by heating at 120° C for 15 minutes. The results of the durability tests of the electrodes of Example 3 are shown in FIG. 3 as curve 8.

EXAMPLE 4

The paste-like electroconductive composition of Example 1 was printed on a glass plate in the form of a pair of electrodes wherein each electrode consisted of a series of smaller electrodes as desribed in Example 1. Each small electrode had a line width of 1 mm, an electrode gap of 2 mm and an electrode length of 155 mm. The printed electrodes were then sintered. The results of the durability tests of the electrodes of Example 4 are shown in FIG. 3 as curve 9.

EXAMPLE 5

Figure 2:
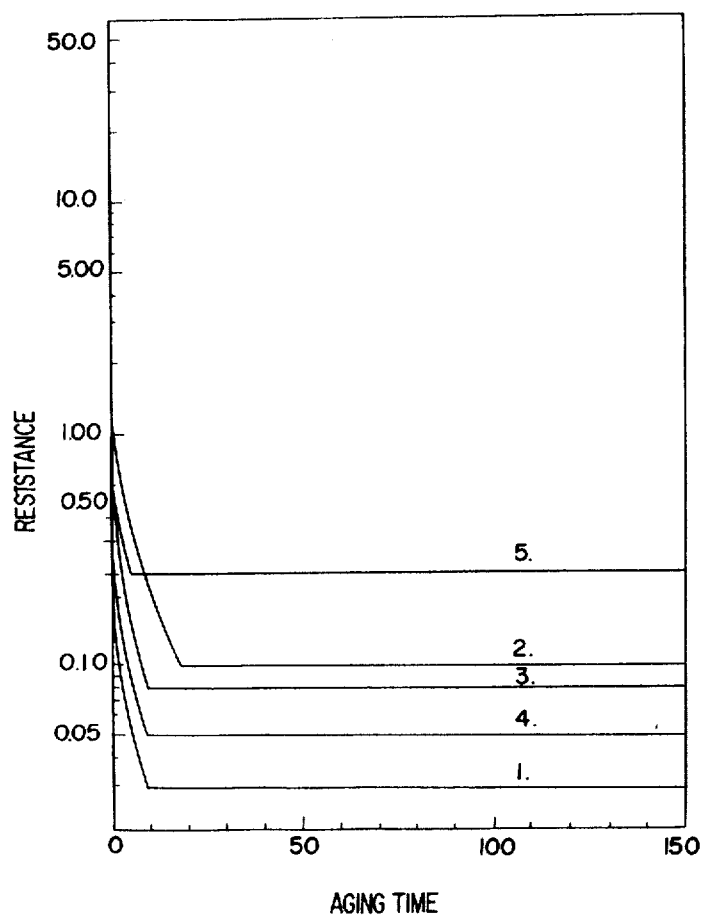
FIGS. 2 and 3 are graphs of the electric resistance when frosted versus ageing time of the humidity sensor which shows the results obtained in durability tests.

The paste-like electroconductive composition of Example 1 was printed on a glass plate in the form of a pair of electrodes wherein each electrode had a line width of 1 mm, an electrode gap of 2 mm and an electrode length of 120 mm. The printed electrodes were sintered. A mixture of 50 vol percent n-(trimethoxysilylpropyl)ethylenediamine, 50 vol percent ethyleneglycoldimethacrylate and 0.5 wt percent of benzoylperoxide to ethyleneglycoldimethacrylate was coated on the plate and cured by heating at 120° C for 1 hour. After cooling, an alternating current of 12 V was impressed across the electrodes in order to conduct the durability tests in which the plate was alternately fogged and defrosted at a rate of 10 cycles per hour. The resistance changes in the durability tests of the electrodes of Example 5 are shown in FIG. 2 as curve 1.

EXAMPLE 6

The pair of electrodes of Example 5 was formed on a glass plate. A prepolymer (B) prepared by polymerizing γ-methacryloxypropyl trimethoxysilane and 0.5 wt percent of benzoylperoxide at 80° C for 100 minutes with stirring was mixed with n-(trimethoxysilylpropyl)ethylenediamine (A) at a ratio of 33 vol percent A and 67 vol percent B. The mixture was coated in the gap between the electrodes and cured by heating to polymerize the mixture at 120° C for 30 minutes and allowed to cool. The results of the durability tests of the electrodes of Example 6 are shown in FIG. 2 as curve 2. The coated membrane obtained was very strongly bonded to the substrate.

EXAMPLE 7

A mixture of 25 vol percent n-(trimethoxysilylpropyl)ethylenediamine and 75 vol percent γ-glycidoxypropyl trimethoxysilane was coated over the gap between the electrodes of Example 5, and was cured by heating at 120° C for 1 hour to polymerize the mixture and allowed to cool. The results of the durability tests of the electrodes of Example 7 are shown in FIG. 2 as curve 3. The coated membrane obtained was very strongly bonded to the substrate similar to the strong bonding of an epoxy resin membrane.

EXAMPLE 8

A mixture of 25 vol percent n-(trimethoxysilylpropyl)ethylenediamine (C), 25 vol percent γ-methacryloxypropyltrimethoxysilane (D), 50 vol percent ethyleneglycol-di-methacrylate and 0.5 wt percent benzoylperoxide based on (C) and (D), was coated over the gap between the electrodes of Example 5 and was cured by heating at 120° C for 120 minutes to polymerize the mixture and the mixture was allowed to cool. The results of the durability tests of the electrodes of Example 8 are shown in FIG. 2 as curve 4.

EXAMPLE 9

A mixture of 50 vol percent n-(trimethoxysilylpropyl)ethylenediamine and 50 vol percent ethanol was coated over the gap between the electrodes and was cured by heating at 140° C for 60 minutes to polymerize the mixture. The results of the durability tests of the electrodes of Example 9 are shown in FIG. 2 as curve 5 (Reference). The following two abrasion resistance tests were conducted on the coated electrodes of Example 5 and the electrodes of Example 9 (Reference).

DURABILITY TEST 1

A piece of sheep skin leather was treated with an aqueous solution of a nonionic surfactant (Lipon F manufactured by Lion Oil and Fat Co.) which did not contain an abrasive agent. The membrane which had formed over the electrodes on a substrate was rubbed with the treated leather 100 times in a direction parallel to the direction of the electrodes, and the membrane was then washed with water and dried. The resistance ratios of the humidity sensors (resistance after test/resistance before test) were measured.

ABRASION TEST 2

A piece of gauze was treated with a cleaner containing an abrasive agent (Glasster manufactured by Nippon Toryo Kogyo K.K.), and the membrane which formed over the electrodes on a substrate was rubbed with the gauze 150 times perpendicular to the direction of the electrodes and 150 times in the direction of the electrodes. The tested membrane was washed with water and dried. The resistance ratios of the humidity sensors (resistance after test/resistance before test) were measured. The test results of the electrodes of Example 5 and the electrodes of Example 9 as the Reference are compared as follows:

|  | Example 5 Invention | Example 9 Reference |
|---|---|---|
| Durability test 1 | 1.0 | 6.0 |
| Abrasion test 2 | 2.3 | 13.0 |

EXAMPLE 10

The following humidity dependency tests were conducted with the electrodes of Example 5 and the electrodes of Example 9 (Reference).

HUMIDITY DEPENDENCY TEST

Figure 4:
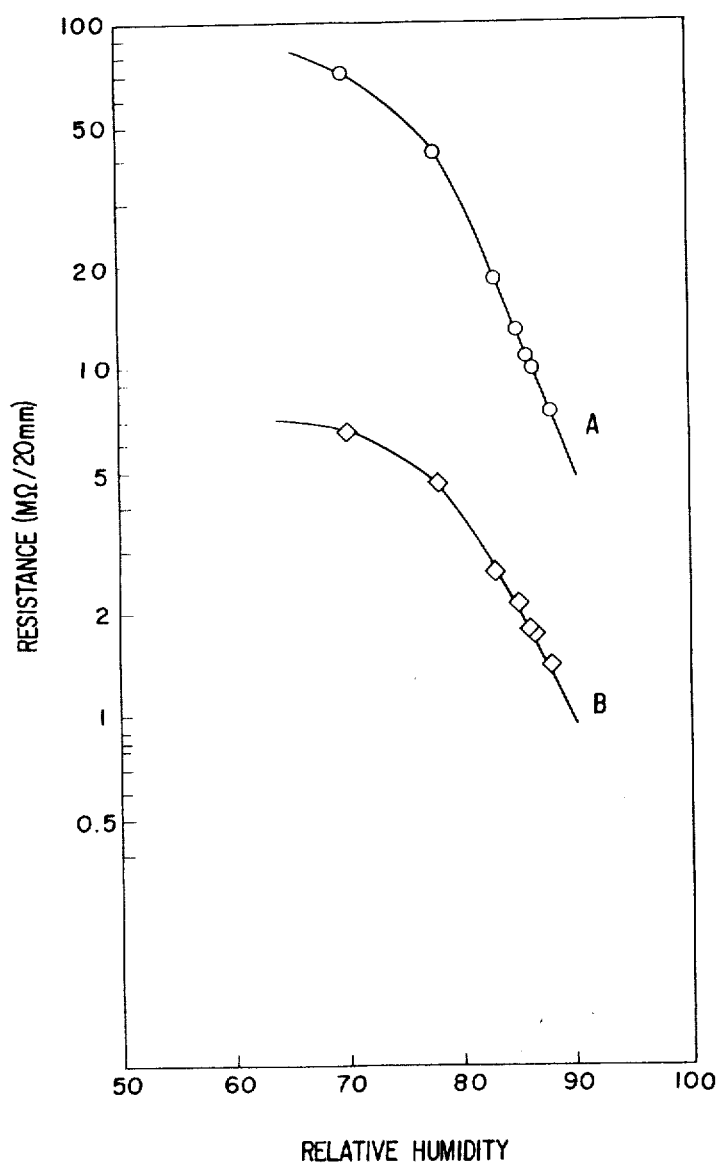
FIG. 4 is a graph of electric resistance versus relative humidity to show the results of humidity dependency tests.

The results of the resistance measurements (M$\Omega$/20 mm) of the humidity sensors of the Examples (calculated as a pair of electrodes having a length of 20 mm) at 20° C are shown for each relative humidity value in FIG. 4, wherein the relative humidity values are on the absissa and the resistance values are on the ordinate. The curve showing the higher resistance values has a lower humidity dependency, and therefore, the sensor exhibiting these values is the superior humidity sensor. In FIG. 4, curve A represents the electrodes of Example 5 (Invention) and curve B represents the electrodes of Example 9 (Reference).

Figure 5:
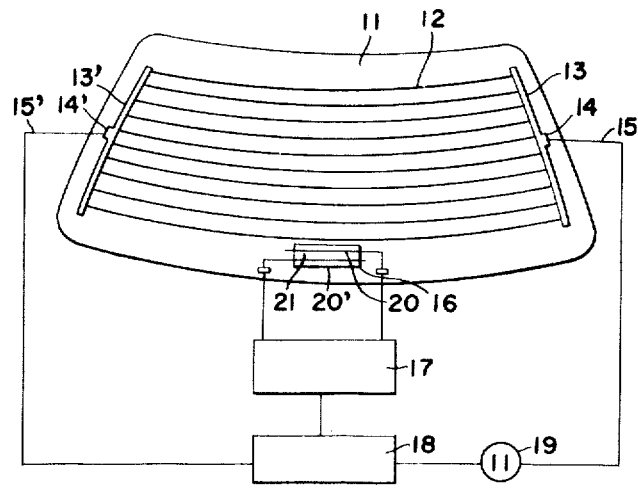
FIG. 5 is a view of one embodiment of the invention wherein a glass windshield is provided with a series of heating elements which are actuated by the humidity sensor of this invention.

FIG. 5 shows one embodiment of the invention wherein the humidity sensor is used on the window of a car. In FIG. 5 glass plate 11, electric heating elements 12, electrodes 13 and 13', terminals 14 and 14', lead wires 15 and 15', humidity sensor teminal 16, detection circuit 17, control circuit 18, and power source 19 are shown. A plurality of electric heating elements 12 are arranged in parallel relationship to one another and the distances of the gaps between the elements are the same. A pair of bus bars 13 and 13' are connected in parallel to the electric heating elements 12 and are arranged along each side of the window glass plate. Heating elements 12 are electrically heated through bus bar 13 which is connected to the control circuit through circuit terminal 14 by lead wire 15. Of course, elements 13', 14' and 15' are arranged in the same manner. A membrane 21 of an amino-group containing organosilicon compound and the reactive compound is formed over the pair of electrodes 20 and 20' of the humidity sensor 16 which is connected to the detection circuit 17 which in turn is connected to the control circuit 18. The detection circuit 17 is activated by the resistance detected by the humidity sensor terminal 16. The detecting circuit then actuates control circuit 18 which supplies current to electric heating elements 12 which heats the window glass.

The humidity sensor of this invention can be used as an automatic switch to defrost glass plates or to automatically actuate a defroster by detecting the moisture which has condensed on the surface of the humidity sensor terminals to remove fog or frost from the surface of the glass plate. The humidity sensor of this invention exhibits no substantial change in resistance when small amounts of moisture condense on the sensor. The sensor is actuated as a switch only when a certain amount of moisture condenses on the sensor. Because the humidity sensor is stable, its resistance increases only very slowly over long periods of operation. It is particularly applicable as an automatic switch to defrost glass plates or to activate a defroster which blows air across the surfaces of the window glasses used in various vehicles such as cars, ships and airplanes. It is also applicable in some types of apparatus which contain glass as well as on window glass in buildings.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a humidity sensor which comprises a pair of electrodes which are arranged parallel to one another with a suitable gap therebetween and which are fitted on the surface of a glass plate to automatically detect the formation of condensed moisture within the gap between the electrodes, the improvement which comprises the application of a membrane over the electrodes of said humidity sensor and the gap between the electrodes wherein said membrane is prepared by curing an amino group containing organosilicon compound, wherein said amino group containing organosilicon compound is an amino-organofunctional alkoxysilane.

2. The humidity sensor of claim 1, wherein said humidity sensor membrane is prepared by curing a mixture of an amino group containing organosilicon compound and a reactive compound which reacts with said organosilicon compound.

3. The humidity sensor of claim 2, wherein said reactive compound contains a reactive double bond which undergoes polymerization, and wherein said reactive compound also reacts with the alkoxyl or amino group of said organosilicon compound.

4. The humidity sensor of claim 1, wherein said amino-organofunctional alkoxysilane is selected from the group consisting of:
$NH_2(CH_2)_2NH(CH_2)_3Si(OCH_3)_3$,
$NH_2(CH_2)_2NH(CH_2)_2Si(CH_3)(OCH_3)_2$,
$NH_2(CH_2)_3Si(OC_2H_5)_3$,
$(CH_3O)_2CH_3SiCH_2C(CH_3)_2NH(CH_2)_2NH_2$,
$(C_2H_5O)_3Si(CH_2)_3N[(CH_2)_2OH]_2$,
$CH_3NH(CH_2)_3Si(OCH_3)_3$,
$[(CH_3)_3SiO]_3Si(CH_2)_3NHCH_2CH_2NH_2$,
$H_2NCH_2CH_2NH(CH_2)_3(CH_3)_2SiOSi(CH_3)_3$,
$(CH_3O)_3Si(CH_2)_3NH_2$,
$(CH_3O)_3Si(CH_2)_3N(CH_3)_2$,
$(C_2H_5O)_2CH_3Si(CH_2)_4NH_2$,
$(CH_3O)_3SiCH_2NHCH_2CH_2NH_2$,
$(CH_3O)_3SiC_6H_4CH_2NHCH_2CH_2NH_2$,
$(CH_3O)_3Si(CH_2)_3NHCH_3$,
$(CH_3O)_3Si(CH_2)_3N(CH_3)_2$.

* * * * *